United States Patent [19]

Hammarlund

[11] 4,096,431
[45] Jun. 20, 1978

[54] DISCONNECTING THYRISTORS FROM THYRISTOR CONTROLLED REACTANCE

[75] Inventor: Bertil Hammarlund, Ludvika, Sweden

[73] Assignee: ASEA Aktiebolag, Vesteras, Sweden

[21] Appl. No.: 779,460

[22] Filed: Mar. 21, 1977

[30] Foreign Application Priority Data

Mar. 29, 1976 Sweden .............................. 7603736

[51] Int. Cl.² .............................................. H02J 3/18
[52] U.S. Cl. ........................................ 323/119; 307/85
[58] Field of Search .................... 307/17, 42, 85, 98; 323/101, 119, 127, 128; 361/62, 67

[56] References Cited

U.S. PATENT DOCUMENTS

| 3,424,971 | 1/1969 | Stackegard | 323/128 X |
| 3,543,045 | 11/1970 | Hammarlund et al. | 361/62 X |
| 3,622,862 | 11/1971 | Boksjo | 307/85 X |

Primary Examiner—A. D. Pellinen
Attorney, Agent, or Firm—Pollock, Vande Sande & Priddy

[57] ABSTRACT

Apparatus for phase compensation of AC networks includes a transformer and at least one reactance element and a control device such as a thyristor to control the reactive power consumed by the reactance element. The control device is connected to reactance element and to the transformer so that the control device can be switched out of the circuit leaving the reactance element still connected to the AC network through the transformer.

4 Claims, 2 Drawing Figures

DISCONNECTING THYRISTORS FROM THYRISTOR CONTROLLED REACTANCE

FIELD OF THE INVENTION

The invention relates to a means for phase compensation in AC networks.

BACKGROUND

The use of reactance elements, such reactors or capacitors or a combination thereof, for phase compensation in AC networks is known. It is also known to connect such reactance elements to the network with thyristors so that the compensation can be made variable, either in steps, by dividing the reactance elements into smaller groups where each group constitutes its own compensating stage with its won thyristor connection, or continuously by phase angle control of the thyristors. In the latter case control may give rise to harmonics in the AC network if the control is not properly arranged.

One advantage of thyristors is their effective control. On the other hand, thyristors as a rule demand a certain amount of service or maintenance which requires disconnecting them from the network. Disconnection of the thyristors results in disconnection of the reactance elements which is not desirable. The same is true, to an evan higher degree, in the case of disconnection for reasons of protection.

It is therefore one object of the invention to provide phase compensation for AC networks with a reactance element and thyristor control which allows the thyristors to be disconnected and which leaves the reactance in the circuit.

SUMMARY OF THE INVENTION

The invention meets the foregoing object by connecting thyristor and reactance elements to a transformer so that when the thyristor is switched out of the circuit the reactance elements are fully connected to the transformer. By connecting the thyristor between the reactance elements and the neutral point of the transformer and connecting said point to earth, the accessibility of the thyristor both for performing service and for protective measures is convenient as the thyristor is at a low voltage level.

BRIEF DESCRIPTION OF THE DRAWINGS

In other respects the invention will be described with reference to the accompanying drawings, in which.

DETAILED DESCRIPTION OF THE DRAWINGS

Figure 1:
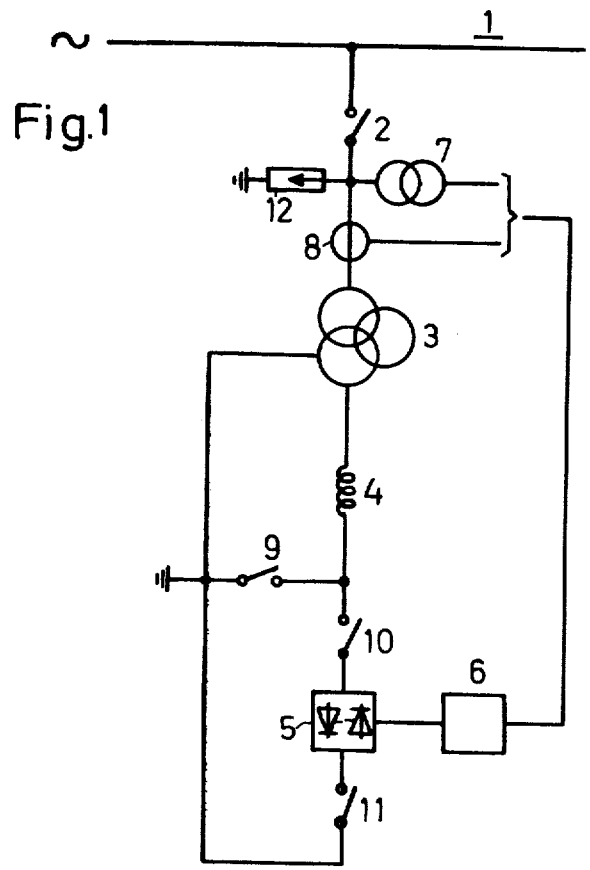
FIG. 1 shows a connection according to the invention in the form of a one-line diagram.

FIG. 1 shows an AC network 1 which is connected to a phase compensating apparatus over a switching member 2 (such as an isolator, circuit breaker, etc.). This apparatus comprises a transformer 3, reactor 4 and a thyristor element 5 with reverse parallel connected thyristors, so that the alternating current from the transformer 3 can be passed on to the extent allowed by the thyristor element. For this purpose a control device 6 is coupled to the thyristor element. A voltage transformer 7 and a current transformer 8 are connected to the input side of the control device 6, and a measure is obtained in the control device 6 for the reactive network power that is to be compensated. The control angles of the thyristors are set in a corresponding manner so that the reactive power of the network is taken up in the phase compensator.

To have access to the thyristor element 5 for service inspection, there are by-pass members 9, for example, isolators and disconnecting switches 10, 11, by means of which the thyristor element 5 can be disconnected from the network. With the illustrated circuit the reactors 4 are fully connected to the network 1, when the thyristor element is disconnected. The same disconnection is used in the event of a fault in the thyristor element 5. Since the connection between the thyristor element 5 and the transformer 3 is at earth potential the thyristor element 5 is at a low potential, which is practical from the point of view of isolation.

If, prior to servicing the thyristor element 5, it is desired to disconnect the reactor 4 from the network, this is effected by reducing the power taken up in the compensating apparatus and opening the switch 2.

Those skilled in the art will understand that for multi-phase networks the reactor 4, thyristor element 5, control device 6 and the switches 9–11 will be duplicated for each phase.

For the reactance elements, one may use the reactor 4, as shown in FIG. 1, or capacitors depending on whether the network is expected to have an excess or deficit of reactive power. It is also possible to use a combination of both reactors and capacitors and only provide one of them with a controlled thyristor connection according to FIG. 1; the resulting reactive power thus being the difference between the power of the two.

To carry off any overvoltages, the apparatus may be provided with a surge diverter 12.

Figure 2:
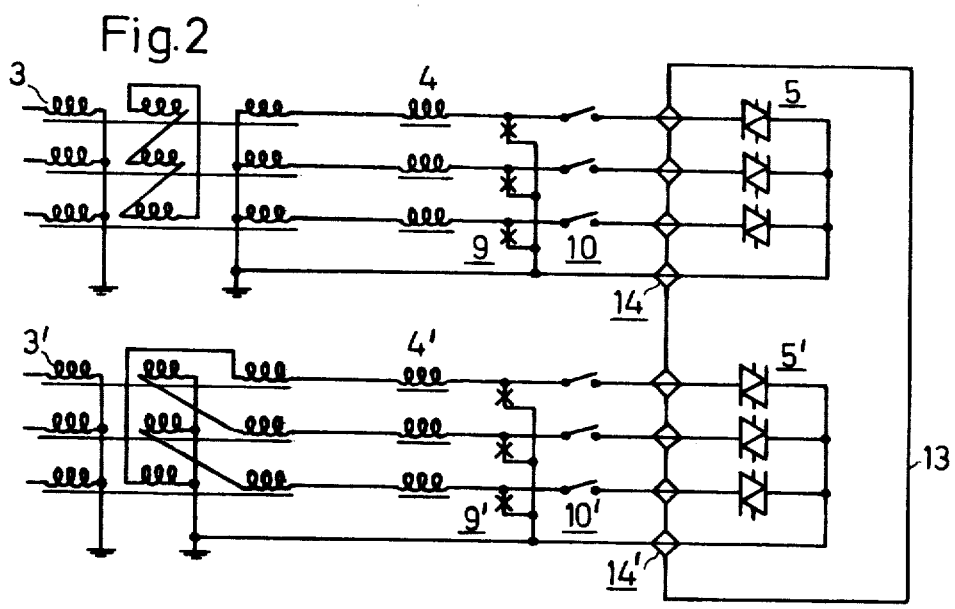
FIG. 2 shows how the pulse number of the thyristor connection can be doubled by dividing the reactance elements into two groups, each having its own thyristor connection.

For a three-phase network, the thyristor element 5 shown in FIG. 1 will have the pulse number 6 with resultant harmonics 5, 7, 11, 13, and so on. To half the harmonic content and above all eliminate the 5th and 7th harmonics, the apparatus can be divided into two portions 3-5 and 3'-5', each with a transformer 3 and 3' with the connection Yo/D/Yo and Yo/Zo, respectively, as shown in FIG. 2. Because of the resultant phase displacement between the two portions, the resultant pulse number is increased to 12 so that the lowest harmonics become the 11th and 13th. Since the thyristor elements are arranged at earth potential, the switches 11 may be omitted. The thyristor elements 5 and 5' are suitably arranged in a valve hall 13 with insulating bushings 14 and 14'.

What is claimed is:

1. Apparatus for phase compensation in an AC network including reactance means and thyristor control means coupled to said network by transformer means in which the improvement comprises
    switching means coupling said thyristor control means, said reactance means and said transformer means for disconnecting said thyristor control means from said reactance means and said transformer means and leaving said reactance means connected in circuit with said transformer means.

2. The apparatus of claim 1 in which said transformer means has a grounded neutral point with said switching means connecting said thyristor control means between said grounded neutral point and said reactance means.

3. The apparatus of claim 1 which said reactance means comprises a pair of reactance groups, each reactance group coupled to a different transformer of said transformer means and a thyristor control element and coupled to said network through said transformers, each of said transformers phase displaced relative to the other whereby the apparatus has an increased pulse number.

4. The apparatus of claim 3 wherein one transformer is a Y/D/Y transformer and said other transformer is a Y/Z transformer.

* * * * *